(12) United States Patent
Doverspike et al.

(10) Patent No.: US 8,406,622 B2
(45) Date of Patent: Mar. 26, 2013

(54) 1:N SPARING OF ROUTER RESOURCES AT GEOGRAPHICALLY DISPERSED LOCATIONS

(75) Inventors: Robert Duncan Doverspike, Tinton Falls, NJ (US); Rakesh Kumar Sinha, Edison, NJ (US); Peter D. Magill, Freehold, NJ (US); Jennifer Yates, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 613 days.

(21) Appl. No.: 12/462,615

(22) Filed: Aug. 6, 2009

(65) Prior Publication Data

US 2011/0033183 A1    Feb. 10, 2011

(51) Int. Cl.
*H04B 10/08* (2006.01)
*H04J 14/02* (2006.01)

(52) U.S. Cl. .................. 398/34; 398/50; 398/57

(58) Field of Classification Search .............. 398/25, 398/34

See application file for complete search history.

(56) References Cited

U.S. PATENT DOCUMENTS

| | | | |
|---|---|---|---|
| 7,599,620 B2 * | 10/2009 | Graves et al. | 398/51 |
| 2003/0072052 A1 * | 4/2003 | Graves et al. | 359/124 |
| 2004/0107382 A1 * | 6/2004 | Doverspike et al. | 714/4 |

* cited by examiner

*Primary Examiner* — Nathan Curs

(57) ABSTRACT

Systems and methods are described that that dynamically configure high-speed data link lightpaths between access routers and backbone routers at geographically dispersed locations to reassign traffic when a backbone router fails or is removed from service. Embodiments reduce the quantity of backbone router ports used in dual backbone router-homed networks.

20 Claims, 10 Drawing Sheets

1:N SPARING OF ROUTER RESOURCES AT GEOGRAPHICALLY DISPERSED LOCATIONS

BACKGROUND OF THE INVENTION

The invention relates generally to network engineering. More specifically, the invention relates to systems and methods that configure high-speed data links between dispersed locations to reroute data traffic between Backbone Routers (BRs).

BRs are routers designed to operate in the Internet backbone or core. A BR supports multiple telecommunications interfaces of the highest speed in use in the core Internet and forwards Internet Protocol (IP) packets at full speed over all of them. BRs also support the routing protocols being used in the core.

A BR is distinct from a Provider Edge (PE) router, also known as an Access Router (AR), since ARs are located at the edge of a backbone network and connect to BRs. ARs contain interfaces that connect to multiple customers and provide a diverse set of IP services such as Virtual Private Networks (VPNs), multicast, and other protocols implemented in customer private network domains and Local Area Networks (LANs). A BR is usually deployed to lower network costs by aggregating traffic into higher rate interfaces, achieving statistical multiplexing and transporting data more economically across longer distances.

Routers operate in two different planes, the control plane, in which the router learns the outgoing interface that is most appropriate for forwarding specific packets to specific destinations, and the data plane, which is responsible for the actual process of sending a packet received on a logical interface to an outbound logical interface.

FIG. 1 shows a typical long-distance network architecture. Redundancy is achieved by connecting each AR (circles) to two BRs (squares) at the same Central Office (CO) location. More specifically, one or more AR interface ports are connected to one or more interface ports of a first BR and one or more interface ports of the same AR are connected to one or more interface ports of a second BR. The connection between interface ports is usually by optical fiber and can traverse other equipment, such as automatic or manual Fiber cross-Connect (FXC) devices or other optical transport equipment.

The physical connection between an AR and a BR is called an "AR-BR link". This AR-BR link includes the interface ports on the two routers. Links that completely lie within the same CO are called "intra-office" links. Links that span two or more COs are called "inter-office" links. If AR-BR links between both BRs are operational (or active), traffic from an AR can flow to either of the two BRs depending on the data traffic's eventual destination. If one or more links between an AR and BR go down (become non-operational), then AR traffic flows to the functioning BR or BRs over the remaining operational links. An AR-BR link on an operational AR becomes non-operational if the following components either fail, or are taken out of service by operations personnel or systems: one or more ports on both ends of an AR-BR link, the connection between the ports of the AR-BR link, or a BR in part or in whole. Note that although the sequence of events might differ in time, whether these components fail or are taken out of service has the same effect on eventual traffic flow.

FIG. 1 also shows ARs that are not co-located with the BRs and are called "remote" ARs (diamonds). In this configuration, the remote ARs also connect to two BRs. Often, the remote ARs connect to BRs in different locations. The purpose is to restore against a failure of the inter-office AR-BR link, which must be transported by long-distance optical transmission equipment and may be more susceptible to failure than intra-office links. While not shown in FIG. 1, inter-office links also connect pairs of BRs.

There are two disadvantages to the standard architecture:
1) at a location having a large number of ARs, the required numbers of ports on a BR may exceed equipment capabilities, and
2) all of the links between an AR and its first BR need to have sufficient capacity to support all traffic from the same AR and its second BR if the second BR fails and vice-versa.

The challenge for network operators is to maintain traffic throughput under the most probable failure conditions. A system and method that responds to failures or maintenance of BRs and their intra-office AR-BR links and then dynamically configures high-speed data links between ARs and BRs at geographically dispersed locations and reroutes traffic to those links achieves the above goal in a cost-efficient manner.

SUMMARY OF THE INVENTION

The inventors have discovered that it would be desirable to have systems and methods that dynamically configure high-speed data link lightpaths between ARs and BRs at geographically dispersed locations. Embodiments reduce the quantity of BR ports used in dual BR-homed networks.

Embodiments improve network reliability by implementing a network architecture that connects alternate ports from ARs at a heavily-used location to spare ports of BRs at lightly-used locations over an optical network.

One or more configurable data link lightpaths between alternate AR and spare BR ports in different locations may be rapidly and dynamically configured to create inter-office AR-BR link lightpaths from ARs in heavily-used locations to BRs in lightly-used locations. The architecture conserves cost by achieving a 1:N restoration effect, where BRs in one lightly-used location can restore AR-BR links from one or more heavily-used locations, as long as AR-BR intra-office link failures experienced at the different heavily-used locations are not simultaneous. Spare wavelengths and facilities in the optical network may be shared over common routes for link failures as long as the failure of any BR equipment (such as a router port) or intra-office facilities (such as fiber connecting the router ports) in any CO is not simultaneous with a failure of BR equipment or facilities in any other CO and not simultaneous with a failure of needed optical network equipment (such as a port on a Reconfigurable Optical Add Drop Multiplexers (ROADM)) or inter-office facilities (such as inter-office fiber).

One aspect of the invention provides a method for configuring a network. Methods according to this aspect of the invention include examining a network topology, identifying Backbone Routers (BRs), their network locations and their associated Access Routers (ARs), identifying BR locations as heavily- and lightly-used, configuring each heavily- and lightly used location, connecting each BR and AR at heavily- and lightly-used locations to a router controller, connecting the router controller to a dynamic optical layer controller, and connecting Optical cross-Connects (OXCs) and Reconfigurable Optical Add Drop Multiplexers (ROADMs) located at heavily- and lightly-used locations to the dynamic optical layer controller.

Another aspect of the invention is configuring each heavily-used location. For each AR, for each AR, connecting one or more network-side active ports and one or more network-side alternate ports to an OXC, for each BR, connecting one client-side port to the OXC for each network-side AR active port, and connecting a number of links equal to the number of alternate AR ports from the OXC to a ROADM, wherein the ROADM may be part of an optical network.

Another aspect of the invention is configuring each lightly-used location. For each AR, for each AR, connecting two or more network-side ports to an OXC, for each BR, connecting two or more client-side ports to the OXC wherein one or more ports may be spare, connecting a number of links equal to the number of spare BR ports from the OXC to a ROADM, wherein the ROADM may be part of the optical network.

Another aspect of the invention is a network architecture that includes one or more Backbone Routers (BRs) having a client-side spare port and one or more Access Routers (ARs) having a network-side alternate port that provides network reliability by connecting an AR alternate port with a BR spare port over an optical network comprising a configurable data link lightpath comprising a first Optical cross-Connect (OXC) connected to a network-side AR alternate port and a first Reconfigurable Optical Add Drop Multiplexer (ROADM), the first ROADM connected to the optical network, and a second OXC connected to a client-side BR spare port and a second ROADM, the second ROADM connected to the optical network, a router controller connected to each BR and AR, a dynamic optical layer controller connected to each OXC, ROADM and the optical network, and the router controller configured to provide data link control between ARs that have network-side alternate ports and BRs that have client-side spare ports and the dynamic optical layer controller configured to determine a data link lightpath between AR alternate ports connected OXCs and BR spare ports connected OXCs.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, system frameworks, and a computer-usable medium storing computer-readable instructions for configuring new or existing network architectures with high-speed configurable data link lightpaths between network-side AR and client-side BR ports located in dispersed locations. The invention may be implemented as a modular framework and deployed as software as an application program tangibly embodied on a program storage device. The application code for execution can reside on a plurality of different types of computer readable media known to those skilled in the art.

Figure 3:
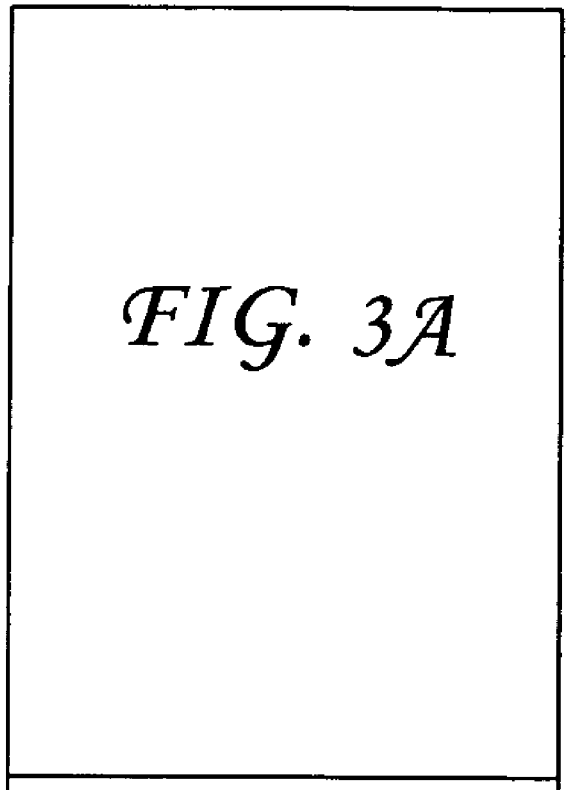
FIG. 3, 3A and 3B are an exemplary network architecture method.
Figure 3:
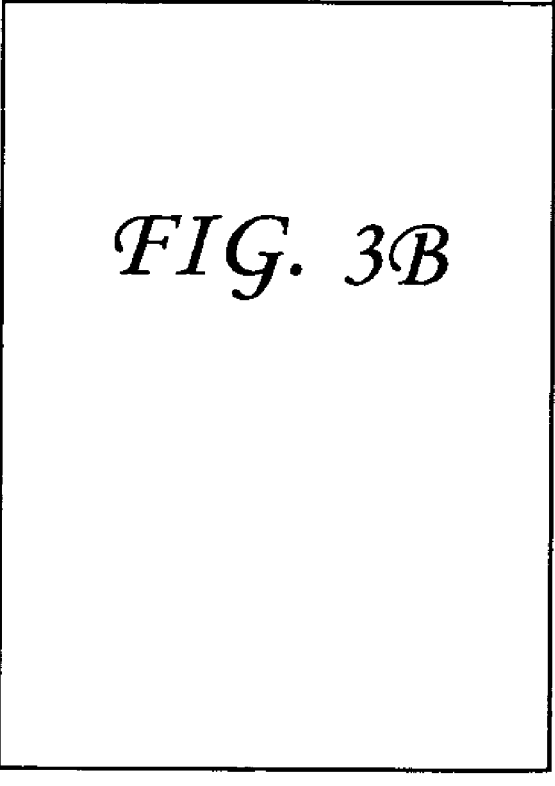
Figure 3A:
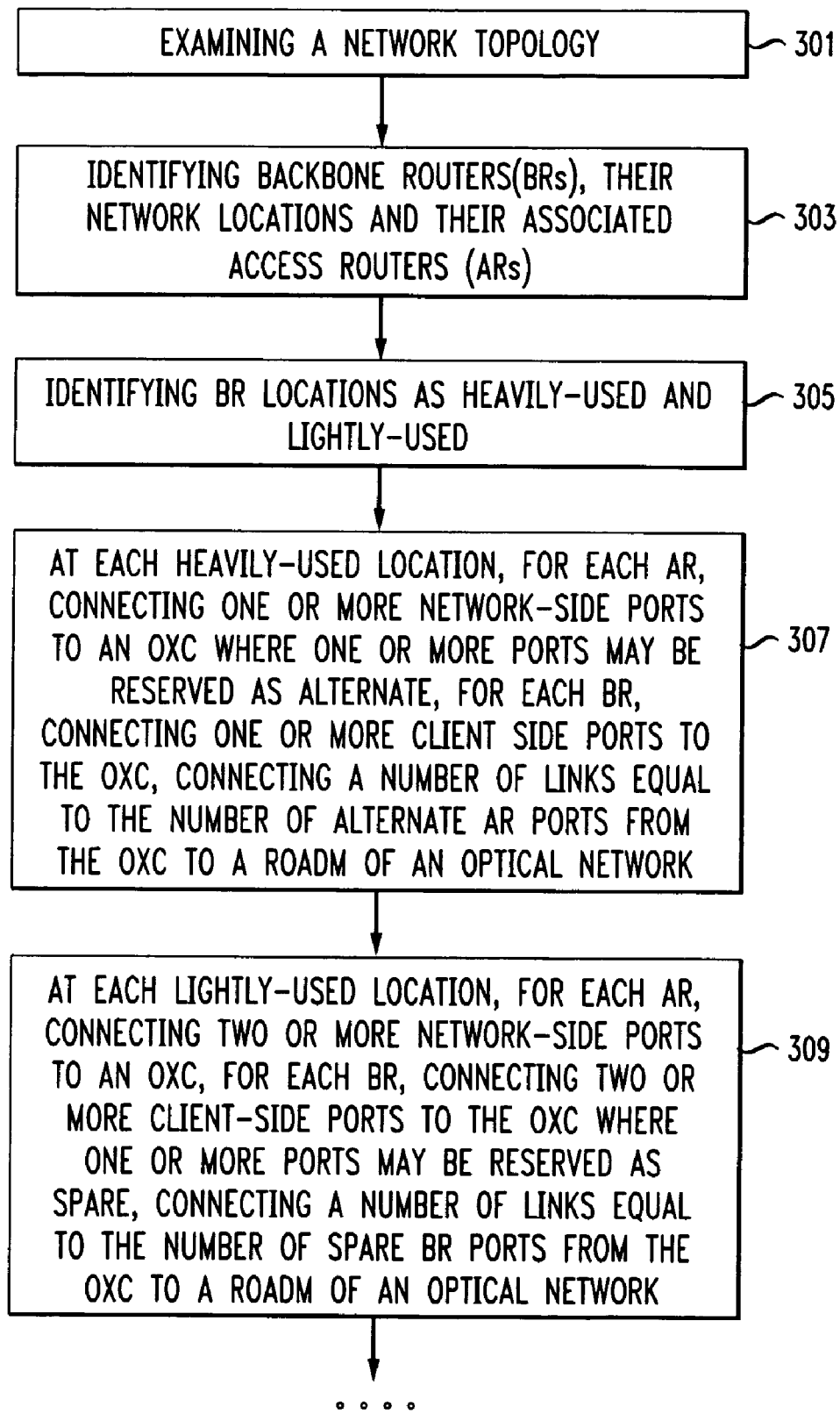
Figure 3B:
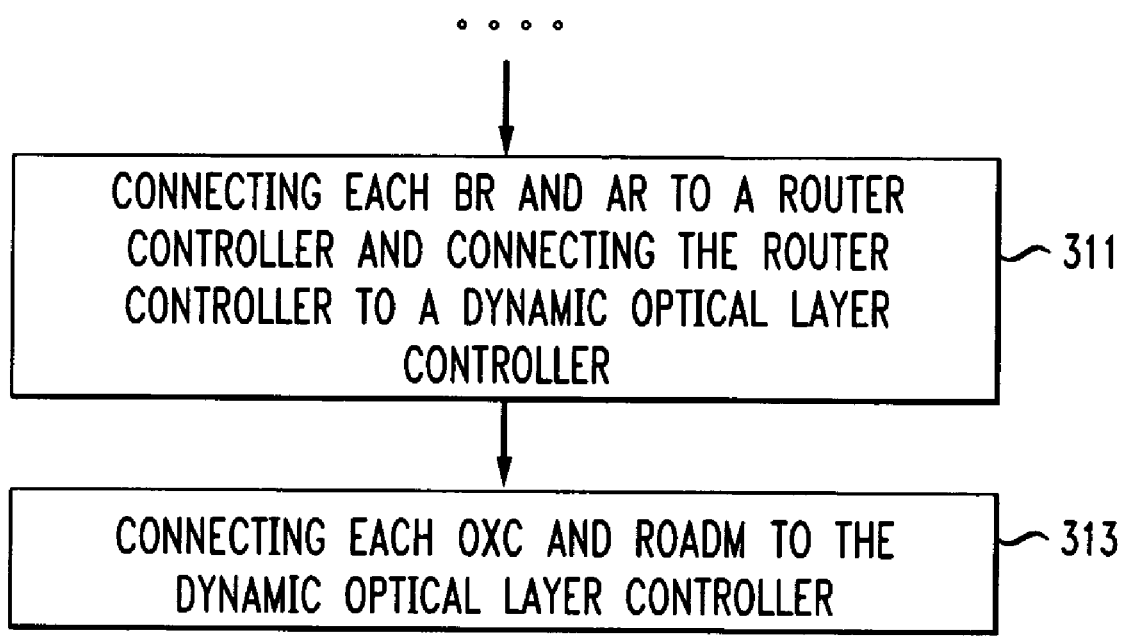

FIG. 3 shows a network architecture configuration method. Embodiments examine network topology information for new or preexisting networks and configure "lightly-used" and "heavily-used" locations. Lightly-used locations usually have a small number of ARs. Heavily-used locations usually have many ARs. The categorizing of locations as lightly- or heavily-used is a network planning optimization process for the purpose of reducing the number of BR ports and thereby reducing overall network capital cost or reducing the size of BRs to meet capacity, power, or space limitations at heavily-used locations. The network planning optimization process is beyond the scope of this disclosure. Each network lightly- or heavily-used location may be located in a building in a metropolitan area (steps 301, 303, 305).

At heavily-used locations, each AR is connected to one BR via one or more intra-office links. At lightly-used locations, each AR is connected to two BRs via two or more intra-office links. The above description of lightly- and heavily-used locations is exemplary. Embodiments do not preclude variations. For example, it might be advantageous to have some ARs at heavily-used locations connect to two BRs over intra-office links. A limited set of ARs that are dual-homed to different BRs at the same heavily-used location may provide high reliability for high-priority services, such as VPN services.

At heavily- and lightly-used locations, intra-office AR-BR links are connected through an OXC. At heavily-used locations, each AR has one or more network-side ports connected to an OXC and each BR has one or more client-side ports connected to the same OXC. One or more aggregated ports of an AR may be reserved as an alternate. The ARs serve to aggregate data traffic and may have multiple lower-load ports and one or more high-load ports referred to as aggregated ports. One or more OXC ports are connected to a ROADM. The number of OXC-ROADM links may equal the number of AR alternate ports connected to the OXC. At least one inter-office BR port, which is a network-facing port, is connected from each BR to the ROADM. The ROADM is connected to an optical network 203 (step 307) and may be part of the optical network 203.

At lightly-used locations, each AR has two or more network-side ports connected to an OXC and each BR has two or more client-side ports connected to the same OXC. BRs have client-side ports for the uplinks from the ARs and network-side ports to connect to another BR in another location which offer the highest speed. One or more client-side ports of a BR may be reserved as spare. One or more OXC ports are connected to a ROADM. The number of client-side spare BR ports may be greater than or equal to the maximum number of network-side alternate AR ports at any heavily-used location that would potentially reroute to it. The number of OXC-ROADM links may equal the number of client-side spare BR ports connected to the OXC. At least one inter-office BR port is connected from a BR to the ROADM. The ROADM is connected to the optical network (step 309).

A configurable data link lightpath comprises an OXC in conjunction with a ROADM located at two or more locations and an optical network coupling the two or more ROADMs together. A dynamic optical layer controller effects configuration of data link lightpaths. Upon failure or maintenance of a BR, or an AR-BR link, the dynamic optical layer controller configures inter-office AR-BR links over configurable data link lightpaths. A router controller detects AR-BR link failures at heavily-used locations and requests new AR-BR data link lightpaths from the dynamic optical layer controller. The router controller also changes router configurations on ARs and BRs to accompany the AR-BR link reconfigurations effected by the optical layer controller (steps 311, 313).

Figure 4:
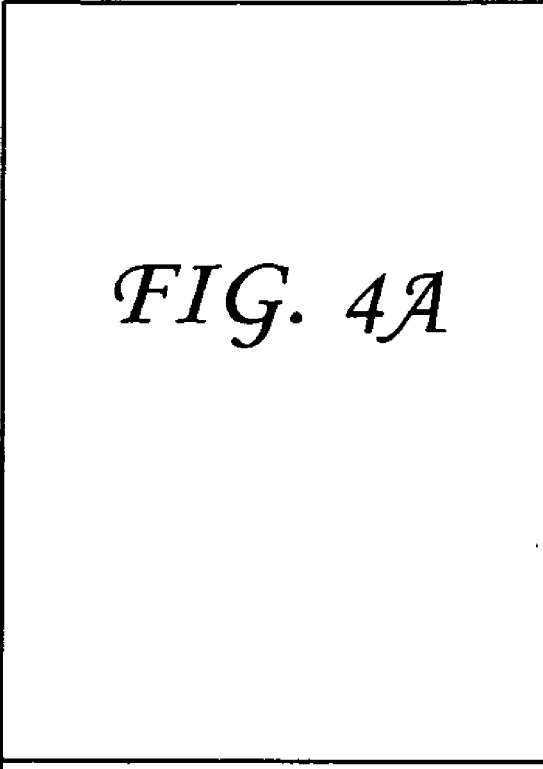
FIG. 4, 4A and 4b are an exemplary 1:N router restoration method.
Figure 4:
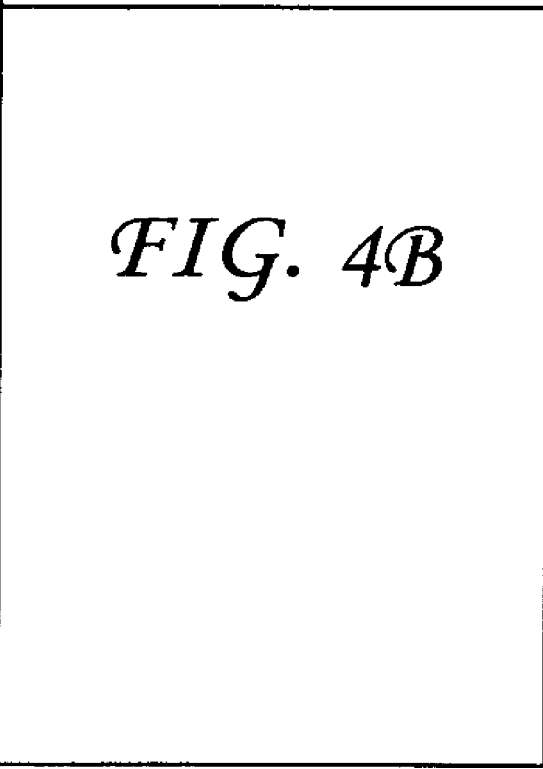
Figure 4A:
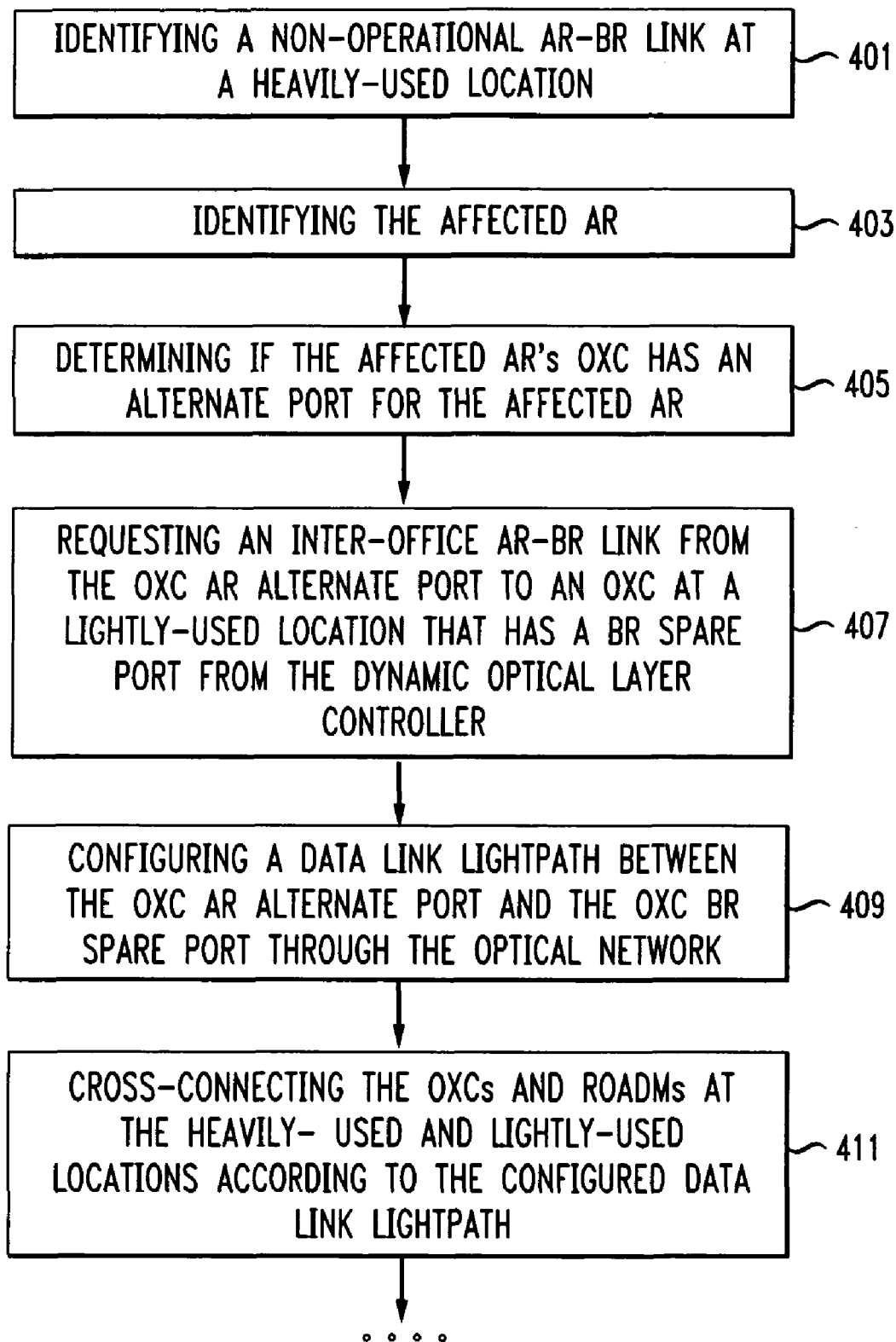
Figure 4B:
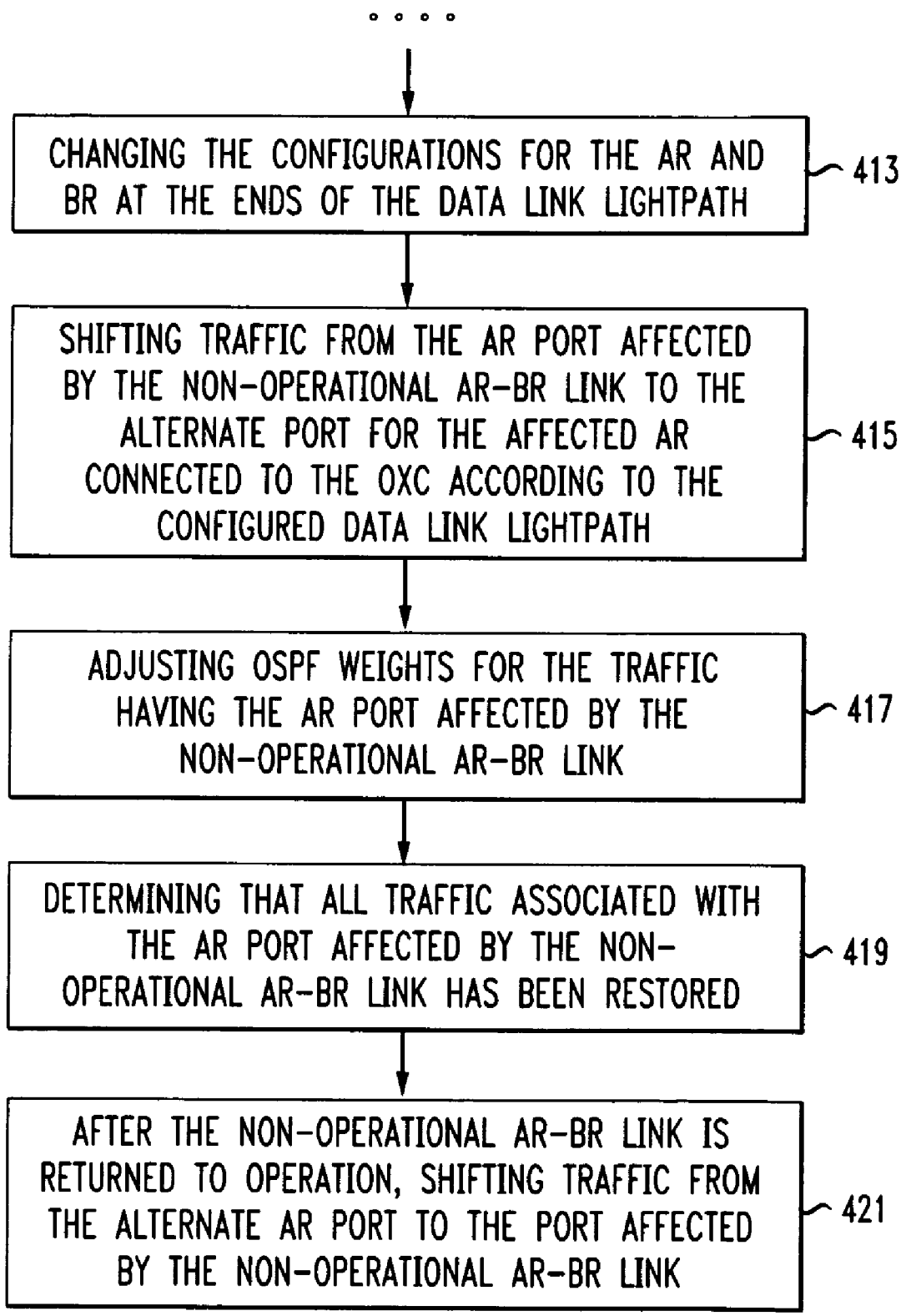

FIG. 4 shows a 1:N router restoration method. When an intra-office AR-BR link (steps 401, 403, 405, 407) at a heavily-used location is determined to be non-operational, embodiments reconfigure the standard data plane architecture at lightly- and heavily-used locations to maintain traffic flow over newly configured inter-office AR-BR data link lightpaths (steps 409, 411, 413, 415, 417, 419, 421). The optical network may be employed on an as-needed basis to connect heavily-used location AR alternate ports to lightly-used location BR spare ports using the remotely-controlled cross-connect capabilities of ROADMs.

By way of background, IP networks operate in data and control planes. The data (forwarding) plane is the path which IP packets follow as they traverse an IP network. This includes routers and links between routers which carry data traffic. The data plane is organized around paths which are established with the goal of sending a data packet out of any given router on a path that will take it toward the interface(s) that are associated with the destination address of that packet. At any point in time, an IP network's data plane has an understanding of where to forward any packet it receives based primarily on the destination address of that packet.

The control plane is used to exchange routing messages. The routing messages enable the data plane to organize itself in an optimal manner. The control plane allows the data plane to be organized around paths which carry packets from a source to a destination. These paths are composed of numerous forwarding decisions made at each router based on routing messages received from the control plane.

Routers typically contain input ports, output ports, a specialized operating system, memory, and one or more processors. Distributed routers require memory for two purposes besides the operating system itself: storing a routing table which is used to perform routing decisions and program a forwarding table, and storing the forwarding table which is used when making forwarding decisions to forward packets out on particular interfaces. These two functions are critical to the operation of any router employed on an IP network.

A router is an electronic device and/or software that connect at least two logical subnetworks, and forwards packets between them. Each packet can traverse many intermediate routers, called hops, as it is routed towards its final destination.

A next hop is the next router to which a packet is sent from any given router as it traverses a network from its source to its destination. In the event that the packet is at the final router in its journey, the next hop is the final destination. A hop is the trip that a packet takes from one router to another or from the final router to the destination. A packet is a fundamental unit of data transmission for packet networks.

Routers route data packets between networks using forwarding or addressing information, such as Multiprotocol Label Switching (MPLS) labels and IP addresses. They use routing protocols and algorithms to populate the routing and forwarding tables to determine the best path to forward the packets. Routers also provide interconnectivity between like and unlike media. This is accomplished by examining the header or preamble of a data packet, and making a decision on the next hop to which it should be sent. Routers can use a variety of routing methods and protocols, including preconfigured static routes, dynamically computed routes using an a Layer-3 Internal Gateway Protocol (IGP), such as IS-IS or OSPF, or Layer-2 protocol, such as RSVP-TE, to select the best route between any two subnets.

Figure 1:
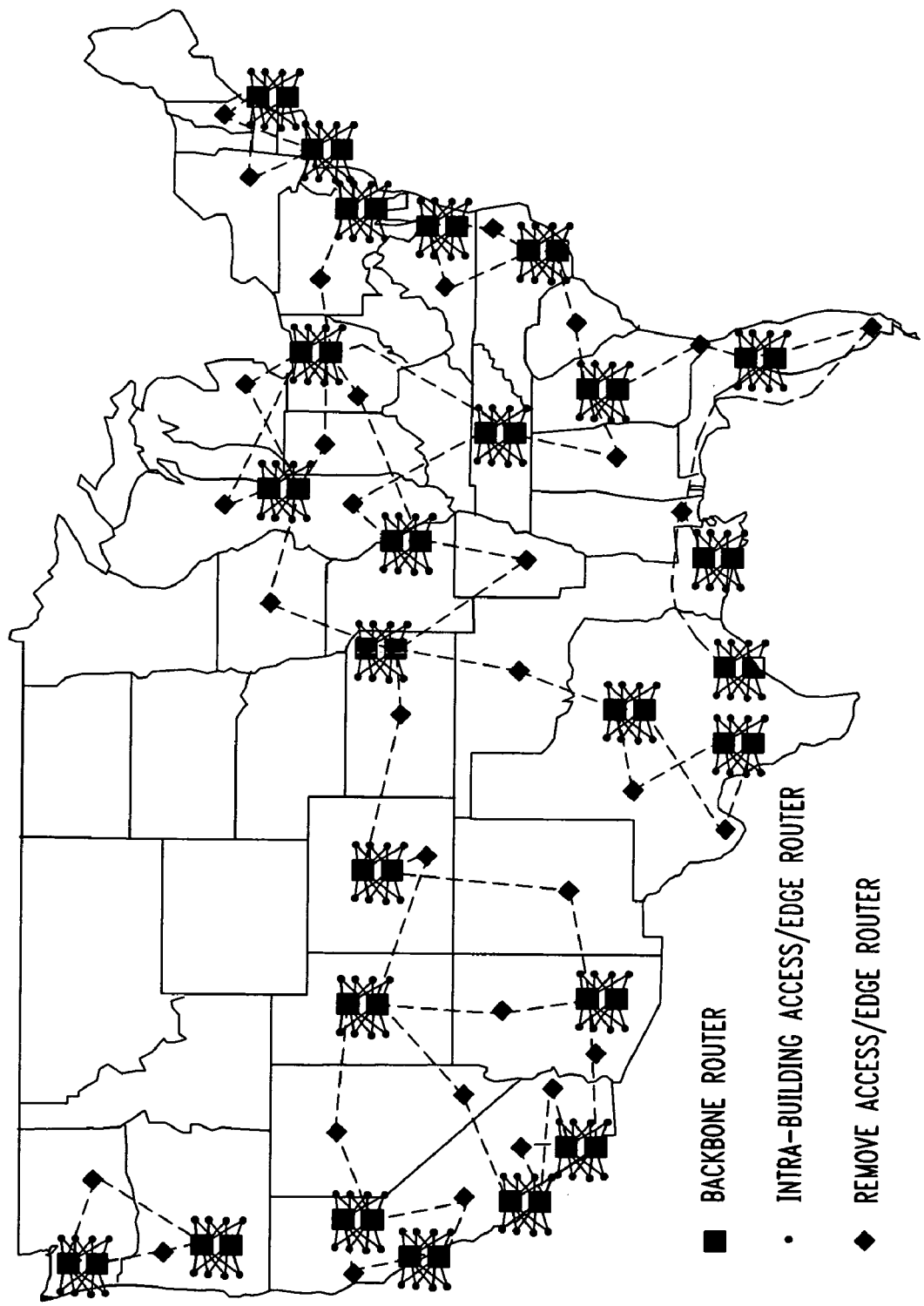
FIG. 1 is an exemplary dual-homed network architecture.
Figure 2A:
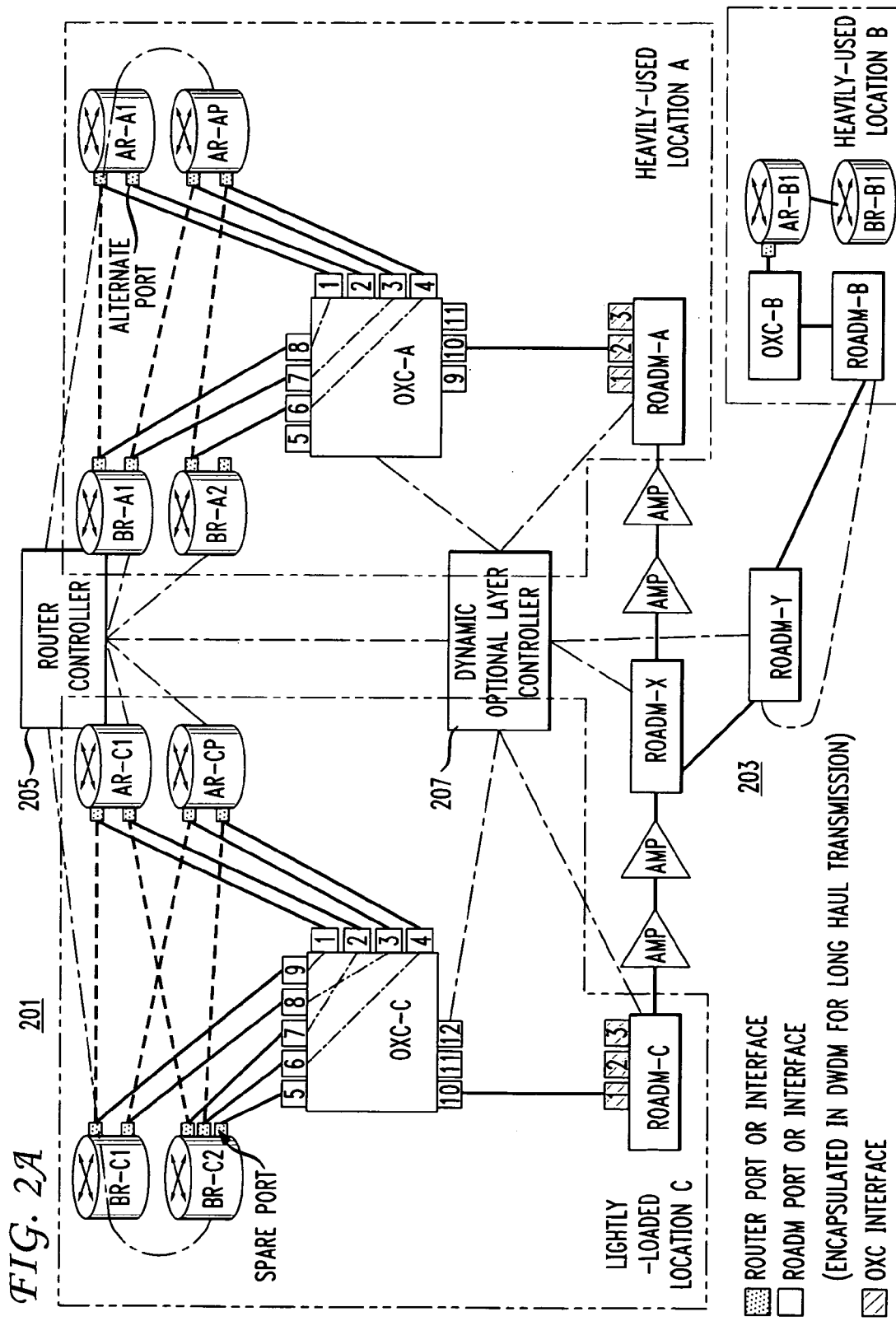
FIG. 2A is an exemplary network data and control plane embodiment.

FIG. 2A shows a data and control plane connectivity embodiment 201. The network architecture and methods apply to unidirectional or bidirectional links that connect router ports. In practice, the signals or circuits provisioned by most inter-office transport equipment, such as ROADMs, are provisioned in bidirectional mode. Similarly, most carriers provision links between router ports in bidirectional mode. For example, if a unidirectional link is set up from router A to router B, a unidirectional link is always set up from router B to router A. Most routers physically arrange their interface ports in pairs of receive and transmit directions, usually on the same interface card.

From a network inventory in conjunction with BR and AR usage, heavily- and lightly-used locations are identified and configured. Location A is heavily-used and includes two ARs: AR-A1, AR-AP (P for priority) (collectively AR-A); two BRs: BR-A1, BR-A2 (collectively BR-A); an OXC: OXC-A and a ROADM: ROADM-A. Location B is heavily-used and includes one AR: AR-B1; one BR: BR-B1; an OXC: OXC-B; and a ROADM: ROADM-B. Location C is lightly-used and includes two ARs: AR-C1, AR-CP (collectively AR-C); two BRs: BR-C1, BR-C2 (collectively BR-C); an OXC: OXC-C and a ROADM: ROADM-C.

At heavily-used location A, AR-A1 has a single active (operational) port and an alternate port connected to OXC-A. AR-AP has two active ports connected to OXC-A. BR-A1 has two active ports connected to OXC-A and BR-A2 has one active port connected to OXC-A. OXC-A port 10 is connected to ROADM-A port 2 which may be part of the optical network 203. At heavily-used location A, each AR-A active port is cross-connected by OXC-A to an active port on BR-A1 or BR-A2. FIG. 2A shows a minimum configuration of links to enable embodiments. In practice, there may be multiple ARs and multiple AR-A to OXC-A to BR-A links between the same AR-BR pair to satisfy the required traffic load. In conjunction, multiple alternate ports on each AR-A may be required to connect to OXC-A to reroute traffic to lightly-used locations in case an AR-BR link becomes non-operational due to maintenance or failure.

At heavily-used location B, AR-B1 has one active port connected to OXC-B and BR-B1 has one active port directly connected to AR-B1. One OXC-B port is connected to ROADM-B which may be part of the optical network 203. Note that FIG. 2A is exemplary and shows a simplified depiction of a heavily-used location. Typically, other heavily-used locations may have a similar configuration as heavily-used location A. Also, there exist inter-office BR-BR links that connect the various locations (the inter-office IP topology). These inter-office BR-BR links would connect to the ROADMs and would be transported by the optical network 203. These BR-BR links are not shown in FIGS. 2A-2C.

At lightly-used location C, AR-C1 and AR-CP each have two active ports connected to OXC-C. BR-C1 has two active ports connected to OXC-C and BR-C2 has three ports connected to OXC-C, two operational and one reserved as spare. OXC-C port 10 is connected to ROADM-C port 1. ROADM-C is connected to the optical network 203. At lightly-used location C, one active port from AR-C1 and AR-CP is cross-connected by OXC-C to an active port on BR-C1 and BR-C2 and another active port from AR-C1 and AR-CP is cross-connected by OXC-C to an active port on BR-C1 and BR-C2. FIG. 2A shows the minimum configuration of links to enable embodiments. In practice, there may be multiple ARs and multiple AR-C to OXC-C to BR-C links between the same AR-BR pair to satisfy the required traffic load.

The OXCs (OXC-A, OXC-B, OXC-C) may be purely optical devices and their ports would be optical connectors with no electrical processing. OXC functionality cross-connects any two of its ports. AR (AR-A, AR-B, AR-C) and BR (BR-A, BR-B, BR-C) functionality is controlled by a router controller 205 and OXC (OXC-A, OXC-B, OXC-C), ROADM (ROADM-A, ROADM-B, ROADM-C) and optical network 203 functionality is controlled by a dynamic optical layer controller 207. The controllers 205, 207 comprise software installed on typical network management servers with interfaces to the network management interfaces on the optical and router equipment. These servers may be co-existent with the network equipment and routers or stand-alone or a combination of both. Furthermore, embodiments are not limited to centralized-control architectures and include distributed implementations where the controllers may comprise a plurality of modules or instantiations that work cooperatively in a distributed fashion. Dotted lines within OXC-A and OXC-C show how the OXC fabric cross-connects network-side AR ports to client-side BR ports. The broken lines between ARs and BRs (intra-office links) show the logical connection between their ports.

An AR-BR link is instantiated by instructing an OXC to cross-connect an AR port with a BR port. At heavily-used locations, an AR port is categorized as alternate if the port is physically connected to an OXC port, but is not cross-connected. At lightly-used locations, a BR port is categorized as spare if the port is physically connected to an OXC port, but is not cross-connected.

ROADMs in the network 201 are connected together over the optical network 203. If an AR-BR link becomes non-operational (fails or is taken out of service for the reasons defined earlier) at a heavily-used location, the router controller 205 in conjunction with the dynamic optical layer controller 207 configure data link lightpaths over the optical network 203, cross-connecting an alternate port of an affected AR at a heavily-used location to a spare BR port at a lightly-used location to restore traffic flow. The router controller 205 requests paths (connections) for the dynamic optical network controller 207 to set up between OXC ports (and ROADM ports) that are connected to BR spare and AR alternate ports.

Because a predetermined number of OXC ports are physically connected to ROADM add/drop ports, called Optical Transponders (OTs), the rate and signal type (such as SONET OC-192, SDH-64, 10 Gigabit Ethernet) of a connection is usually automatically detected by the OT. If not, it can be requested as an attribute in the connection request by the dynamic optical network controller 207. Embodiments do not restrict or specify the protocol and format of the interface between the router controller 205 and dynamic optical network controller 207. Typical interface languages include XML, TL1, CORBA, UNIX socket and SNMP. The interface between the router controller 205 and BRs and ARs may include but is not limited to SNMP, vendor-specific text-based Command Line Interfaces (CLI), and TL1. Some router vendors supply Element Management Systems (EMSS) that control their routers, for which the interface languages may include but are not limited to XML, TL1, CORBA, UNIX socket, and SNMP. The router controller 205 discovers links that are operational or non-operational in the network 201 and determines which router ports are in- or out-of-service. Its database determines where BR spare ports exist and how to associate the BR spare ports with AR-BR links that fail.

The dynamic optical network controller 207 interfaces with the router controller 205 to discover in the ROADM/OXC network topology, network elements, assigned wavelengths, free wavelengths, wavelength constraints (such as loss, distance, rate, optical impairments), available and assigned add/drop and intermediate OTs plus their wavelength constraints. The dynamic optical network controller 207 determines paths through the optical network 203 to establish connections requested by the routing controller 205. Beyond the network discovery capability described above, once connection paths are determined, the dynamic optical network controller 207 communicates with network elements to set up and/or remove cross-connections. The languages to communicate with network elements include but are not limited to XML, TL1, CORBA, UNIX socket, SNMP, and text-based Command Line Interfaces (CLI). This communication can occur through direct connection to a network element or indirectly through an EMS. The ability to establish optical connections is a generic capability of the dynamic optical network controller 207 and may be used by applications other than the AR-BR application used by the embodiments.

The optical network 203 may employ Dense Wavelength Division Multiplexing (DWDM) technology, optical amplifiers (AMPs), fiber optic cables, electrical (digital) cross connects and OTs which are shown as ROADM ports/interfaces. Add/drop OTs are Electrical-Optical (EO) converters that input digital signals (either optically or electrically) from routers, switches, or other transmission equipment and via lasers, convert them into optical light pulses at a specific wavelength. The multiple light pulses at different wavelengths are multiplexed into a single fiber by sending them through an optical multiplexing device such as an Arrayed-Waveguide Grating (AWG) or similar device. The add/drop OT in the receive direction detects optical signals with an optical detection device such as a photodiode.

Besides interfacing with add/drop signals as described above, ROADMs contain capability that optically cross-connect the add/drop signals output (input) by the OTs into wavelengths transmitted (received) on interfacing (network-facing) fibers. Furthermore, a ROADM can optically cross-connect optical pulses at a given wavelength on one network-facing fiber to the same wavelength on another network-facing fiber without electrical conversion. However, intermediate OTs are O-E-O devices used to regenerate weak optical signals transmitted over long distances at intermediate locations in both directions (similar in functionality to back-to-back add/drop OTs). Besides regeneration, intermediate OTs also can be used to convert an end-to-end signal from one wavelength to another.

Figure 2B:
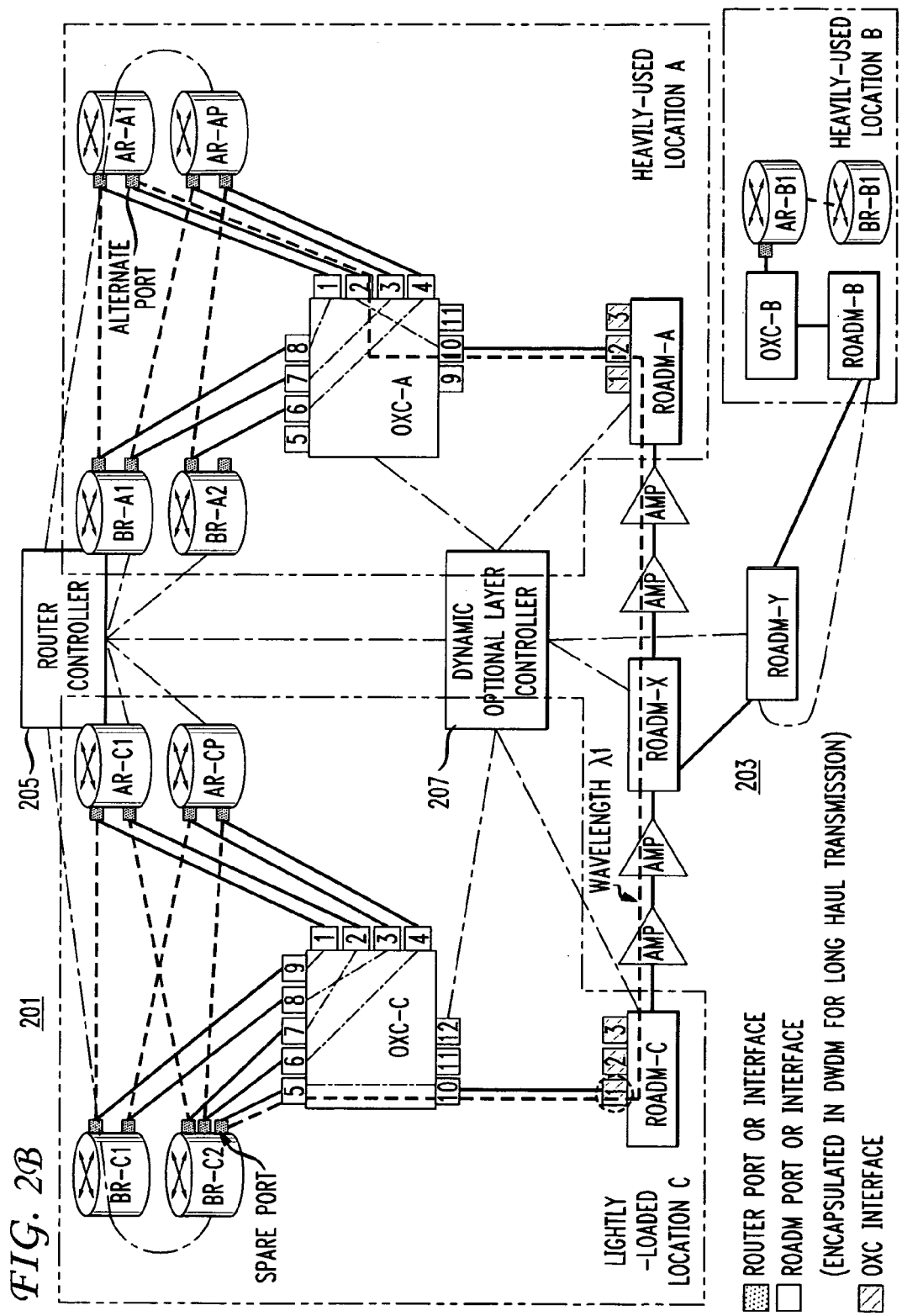
FIG. 2B is an exemplary network reroute after a BR failure (BR-A1) at heavily-used location A.
Figure 2C:
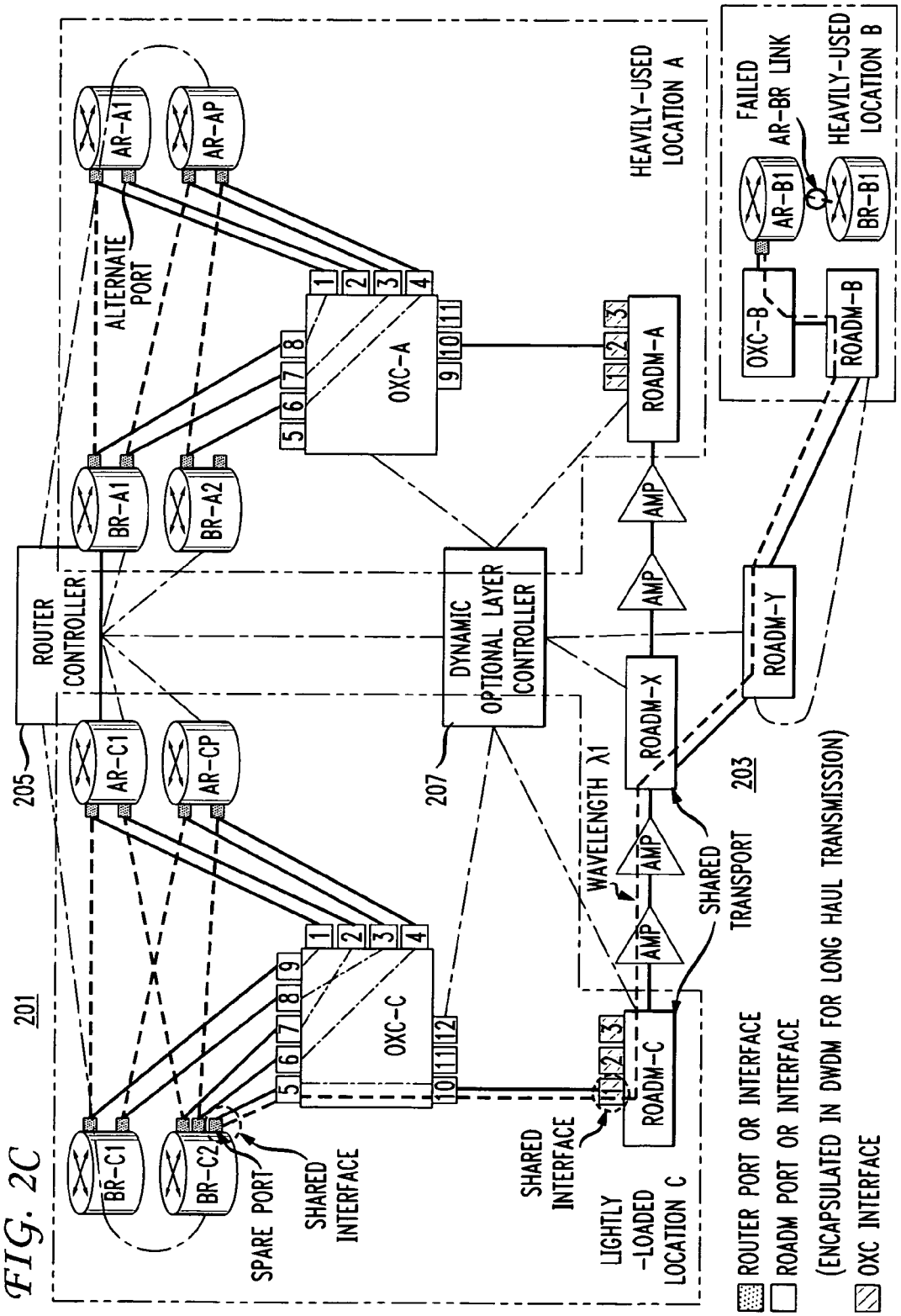
FIG. 2C is an exemplary network reroute after a BR failure (BR-B1) at heavily-used location B.

FIGS. 2B and 2C show BR-A1 and BR-B1, respectively, out-of-service at heavily-used locations A and B due to a maintenance event, such as a software upgrade, or a failure event, such as equipment or fiber failure. For a network maintenance event, network operations personnel or a network maintenance system (a maintenance interface) performing this service communicates with the router controller 205 that the BR will be removed from service. For other events such as equipment or fiber failure, various router protocols detect non-operational links and notify the router controller 205. The router controller 205 performs an examination of the complete network 201 and determines the loads of ARs. If needed, the router controller 205 requests data link lightpaths between ports on OXCs at different locations from the dynamic optical layer controller 207 and configures the port settings and topology database on the routers.

FIGS. 2B and 2C show data and control planes with heavily-used locations A and B, and lightly-used location C in conjunction with optical network 203 data flows. Standard mechanisms, such as sending periodic hello packets, detects that an AR-BR link is operational. In a typical long-distance network, it is likely that five or more heavily-used locations may share one lightly-used location, thus maximizing reduction of BR intra-office ports. AR-AP and AR-CP are dedicated to premium-service such as VPN service. In heavily-used location A, AR-AP is associated with (dual-homed through two active intra-office AR-BR links) BR-A1 and BR-A2. However, in most carriers such services are a small percent of overall traffic and therefore the cost and port-saving advantages of these embodiments are still obtained.

Although the figures show one or two ports on each AR, embodiments may cover any number of AR ports. For ARs using more than two intra-office links, the AR ports are categorized into two sets of ports: a first port set homes to a first BR (BR-C1) and the second port set homes to a second BR (BR-C2). The description and configurations of these figures that describe AR first and second ports can be extended to any port in the first set and any port in the second set, respectively.

The alternate port on AR-A1 is connected to OXC-A port 2, but during a normal (non-failure or non-maintenance) network state where the AR-A1 to OXC-A port 1 to OXC-A port 8 to BR-A1 link is operational, the alternate AR-A1 port is not cross-connected within the OXC-A fabric and is inactive (FIGS. 2A and 2C).

BR-C2 has a spare port that is connected to OXC-C port 5 but is not cross-connected (FIG. 2A) within the OXC-C fabric until needed by an AR in a heavily-used location (A or B) that homes on location C.

FIG. 2B shows a failure or maintenance activity involving BR-A1 at heavily-used location A. The traffic that normally flows over failed links AR-A1 to OXC-A port 1 to OXC-A port 8 to BR-A1 is rerouted over a configured data link lightpath AR-A1 to OXC-A port 2 to OXC-A port 10 to ROADM-A port 2 to ROADM-X to ROADM-C port 1 to OXC-C port 10 to OXC-C port 5 to BR-C2. Since links AR-AP to BR-A1 and AR-AP to BR-A2 were cross-connected and active prior to failure/maintenance, there is minimal packet loss so that higher reliability is obtained for the premium service provided by AR-AP. For non-premium ARs in heavily-used locations, upon failure or maintenance of intra-office AR-BR links, by controlling the cross-connect fabrics of ROADMs and OXCs, the dynamic optical layer controller 207 can reconfigure paths/connections between AR alternate and BR spare ports at dispersed locations.

If router BR-A1 fails, the router controller 205 detects that links AR-A1 to BR-A1 and AR-AP to BR-A1 are non-operational. Alternatively, router BR-A1 is planned to be taken out of service for maintenance, in which case router controller 205 is informed ahead of time by operations personnel or a system. In either situation, the router controller 205 determines that links AR-A1 to BR-A1 are not protected by active links on BR-A2. The router controller 205 requests to the dynamic optical layer controller 207 to configure a data link lightpath between OXC-A port 2 (that connects with an alternate AR-A1 port) to a spare BR port via OXC-C. The dynamic optical layer controller 207 configures a data link lightpath by requesting OXC-A to cross-connect OXC-A port 2 to OXC-A port 10. OXC-A port 10 is connected to ROADM-A add/drop port 2. The dynamic optical layer controller 207 requests ROADM-A to optically cross-connect ROADM-A add/drop port 2 to an unassigned optical network 203 channel/wavelength $\lambda 1$ between ROADM-A and an optical network 203 ROADM ROADM-X, and requests ROADM-X to cross-connect $\lambda 1$ on ROADM-A to ROADM-X to wavelength $\lambda 1$ between ROADM-X and ROADM-C, as long as $\lambda 1$ between ROADM-A and ROADM-X and ROADM-X and ROADM-C is unassigned. FIG. 2B does not show intermediate electrical-optical regeneration, but for longer distances it may be required at an intermediate ROADM in the optical network 203. If regeneration occurs at an intermediate ROADM, then cross-connection to a different wavelength, such as wavelength $\lambda 2$, is possible.

Multiple wavelengths are multiplexed into one fiber by the ROADMs. Configurable data link lightpaths may require multiple fibers if the number of AR-BR links needed to be rerouted exceeds the capacity of the wavelength multiplexing capacity of a ROADM. The number of wavelengths needed to transport AR-BR links is determined by their data rate. If the data rate of the AR-BR link is less than that of a wavelength transported in the optical network, then multiple AR-BR links can be multiplexed into one wavelength at the OT. There still needs to be an OXC port for each AR alternate and BR spare port. For example, if the AR-BR link rates are 10 Gb/s and an optical wavelength can transport at the rate of 40 Gb/s, then an OT would have four ports to interface four AR alternate and BR spare ports and multiplex them into one wavelength.

ROADM-C is requested to cross-connect wavelength $\lambda 1$ to ROADM-C add/drop port 1 that is connected to OXC-C port 10. OXC-C cross-connects OXC-C port 10 to OXC-C port 5, which is connected to a spare port on BR-C2. Data flows over the configured data link lightpath between the alternate port on AR-A1 and spare port on BR-C2.

FIG. 2C shows a BR failure or maintenance event at heavily-used location B where network rerouting behaves analogously to that in location A. Since the probability of simultaneous failures or maintenance events (double failures/maintenance events) at both heavily-used locations A and B are very rare, the intersecting ROADM sections between locations A and C and locations B and C can share the free wavelengths along those paths. Embodiments reserve restoration wavelengths in the optical network 203 transport to provide the AR-BR restoration capability to cover potential failures at heavily-used locations. For each lightly-used location, the wavelength requirements between each ROADM span can be found by maximizing the number of wavelengths needed on that span by each heavily-used location. The more overlapping that occurs on spans along paths among heavily-used locations that home to the same lightly-used location, the more savings of wavelength capacity can be realized.

Embodiments may map a plurality of AR alternate ports from several (N) heavily-used locations to the same BR in a lightly-used location. This has the net effect of port savings via 1:N sharing. Studies in realistic carrier networks show that the required port count for BRs in heavily-used locations may be reduced by nearly 50% and could stay within expected router-vendor design capabilities at current growth rates. Embodiments may use fewer long-haul wavelengths by routing sub-wavelength-rate connections to muxponder ports (as opposed to transponder ports), thereby electronically multiplexing some links (usually 4) onto one transport wavelength. Embodiments may set-up connections in the ROADM layer and the OXC may be controlled by either a distributed or centralized mechanism.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for configuring a network comprising:
examining a network topology;
identifying backbone routers to yield identified backbone routers;
identifying network locations of each of the identified backbone routers, and access routers associated with the identified backbone routers at each of the network locations;
defining the network locations as heavily- and lightly-used network locations;
configuring each heavily- and lightly-used network location;
connecting each identified backbone router and each access router at the heavily- and the lightly-used network locations to a router controller;
connecting the router controller to a dynamic optical layer controller; and
connecting optical cross-connects and reconfigurable optical add drop multiplexers located at each heavily-used network location and each lightly-used network location to the dynamic optical layer controller.

2. The method according to claim 1 wherein heavily- and lightly-used network locations are defined by the number of their associated access routers.

3. The method according to claim 1 wherein the router controller communicates with the identified backbone routers and the access routers at the heavily- and the lightly-used network locations using SNMP, vendor-specific text-based command line interfaces or TL1.

4. The method according to claim 1 wherein configuring each heavily-used network location further comprises:
for each access router, connecting one or more network-side active ports and one or more network-side alternate ports to an optical cross-connect;
for each identified backbone router, connecting one client-side port to the optical cross-connect for each network-side access router active port; and
connecting a number of links equal to the number of alternate access router ports from the optical cross-connect to a reconfigurable optical add drop multiplexer, wherein the reconfigurable optical add drop multiplexer is part of an optical network.

5. The method according to claim 4 wherein configuring each lightly-used network location further comprises:
for each access router, connecting two or more network-side ports to an optical cross-connect;
for each identified backbone router, connecting two or more client side-ports to the optical cross-connect wherein one or more of the client side-ports are spare;
connecting a number of links equal to the number of spare backbone router ports from the optical cross-connect to a reconfigurable optical add drop multiplexer, wherein the reconfigurable optical add drop multiplexer is part of the optical network.

6. The method according to claim 5 further comprising identifying a non operational access router-backbone router link at a heavily-used network location by the router controller.

7. The method according to claim 6 further comprising identifying an affected access router linked by the non operational access router-backbone router link at the heavily-used network location.

8. The method according to claim 7 further comprising requesting an inter-office access router-backbone router link lightpath from the dynamic optical layer controller.

9. The method according to claim 8 further comprising determining a path from one of the optical cross-connect access router alternate ports at the heavily-used network location to an optical cross-connect backbone router spare port at a lightly-used network location.

10. The method according to claim 9 further comprising configuring a data link lightpath between the one of the optical cross-connect access router alternate ports and the optical cross-connect backbone router spare port through the optical network.

11. The method according to claim 10 further comprising cross-connecting the optical cross-connects at the heavily- and lightly-used network locations according to the configured data link lightpath.

12. The method according to claim 11 further comprising changing the configurations for the access router and backbone router at the ends of the configured data link lightpath.

13. The method according to claim 12 further comprising shifting traffic from an access router port affected by the non-operational access router-backbone router link to the one of the optical cross-connect access router alternate ports at the heavily-used network location.

14. The method according to claim 13 wherein shifting traffic further comprises adjusting OSPF weights for the traffic having the access router port affected by the non-operational access router-backbone router link.

15. The method according to claim 14 further comprising determining that all traffic associated with the access router port affected by the non-operational access router-backbone router link has been restored.

16. The method according to claim 15 further comprising after the non-operational access router-backbone router link is returned to operation, shifting traffic from the one of the optical cross-connect access router alternate ports at the heavily-used network location back to the access router port affected by the non-operational access router-backbone router link.

17. The method according to claim 10 further comprising reserving restoration wavelengths in the optical network to provide the configured data link lightpath.

18. The method according to claim 17 wherein for each lightly-used network location, restoration wavelength requirements between each reconfigurable optical add drop multiplexer span are found by maximizing a number of wavelengths needed on that span by each heavily-used network location.

19. A tangible computer-usable medium having computer readable instructions stored thereon for execution by a processor to perform a method for configuring a network, comprising:
- examining a network topology;
- identifying backbone routers to yield identified backbone routers;
- identifying network locations of each of the backbone routers, and access routers associated with the identified backbone routers at each of the network locations;
- defining the network locations as heavily- and lightly-used network locations;
- configuring each heavily- and lightly-used network location;
- connecting each identified backbone router and each access router at the heavily- and the lightly-used network locations to a router controller;
- connecting the router controller to a dynamic optical layer controller; and
- connecting optical cross-connects and reconfigurable optical add drop multiplexers located at each heavily-used network location and each lightly-used network location to the dynamic optical layer controller.

20. The tangible computer-usable medium according to claim 19 wherein configuring each heavily-used network location further comprises:
- for each access router, connecting one or more network-side active ports and one or more network-side alternate ports to an optical cross-connect;
- for each identified backbone router, connecting one client-side port to the optical cross-connect for each network-side access router active port; and
- connecting a number of links equal to the number of alternate access router ports from the optical cross-connect to a reconfigurable optical add drop multiplexer, wherein the reconfigurable optical add drop multiplexer is part of an optical network.

* * * * *